May 15, 1923.

J. SWINLAND

VEHICLE

Filed April 13, 1922

Inventor
John Swinland

Attorney

May 15, 1923.                    J. SWINLAND                    1,455,124
                                   VEHICLE
                          Filed April 13, 1922           2 Sheets-Sheet 2
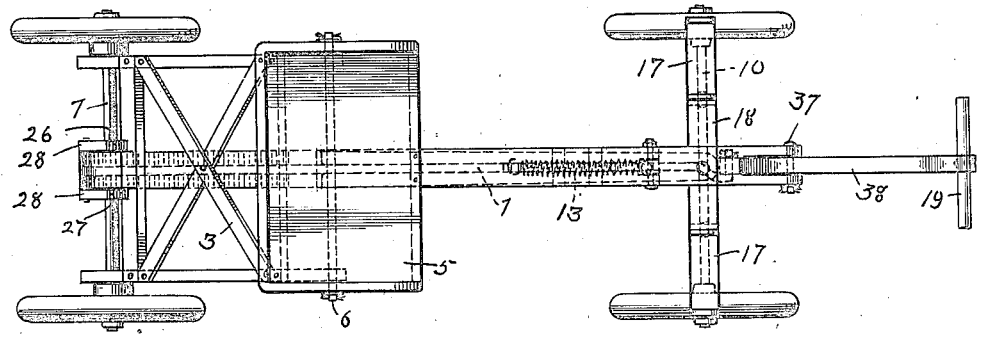
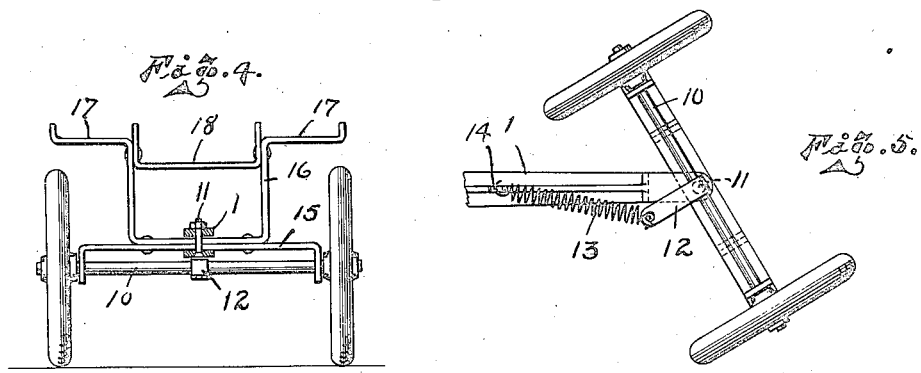
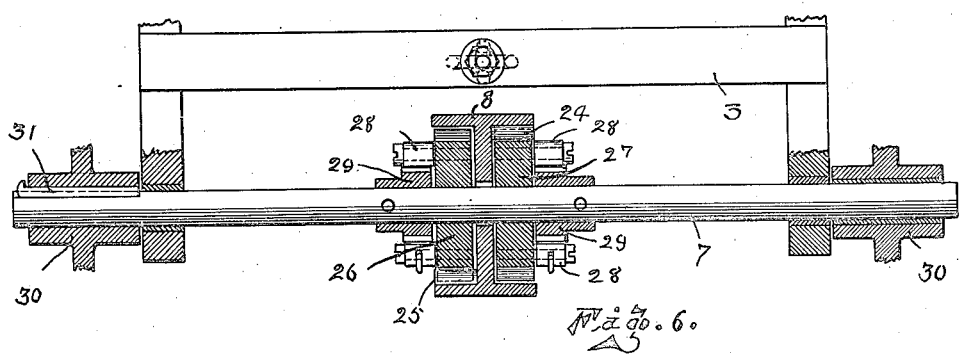
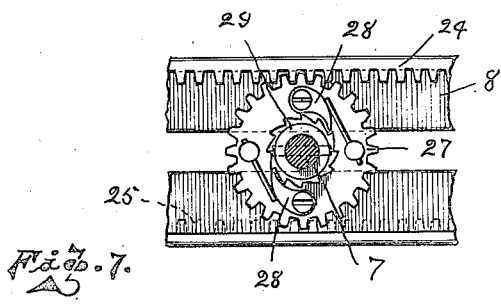
Inventor
John Swinland
Geo Sturus
Attorney Patented May 15, 1923.

1,455,124

UNITED STATES PATENT OFFICE.

JOHN SWINLAND, OF DULUTH, MINNESOTA.

VEHICLE.

Application filed April 13, 1922. Serial No. 552,078.

*To all whom it may concern:*

Be it known that I, JOHN SWINLAND, a citizen of the United States, residing at Duluth, in the county of St. Louis and State of Minnesota, have invented certain new and useful Improvements in Vehicles, of which the following is a specification, reference being had therein to the accompanying drawing.

This invention relates to vehicles and has special reference to a hand propelled child's vehicle; the principal object being to provide a novel form of amusement device for children.

Another object of the invention is to produce means whereby the reciprocal action of the operating lever and the operator of the vehicle will produce continuous forward movement thereof.

Other objects and novel features of the device will appear in the further description of the invention.

Referring to the accompanying drawing forming part of this application in which like reference characters indicate like parts:

Figure 3 is a plan view of Figure 1;

Figure 4 is an elevation of a foot rest and front axle of the vehicle;

Figure 5 is a plan view of the front axle and its connection to the chassis;

Figure 6 is a vertical section through the rear axle assembly, and

Figure 7 is a sectional view of the rear axle showing one side of the transmission mechanism in elevation.

Figure 1:
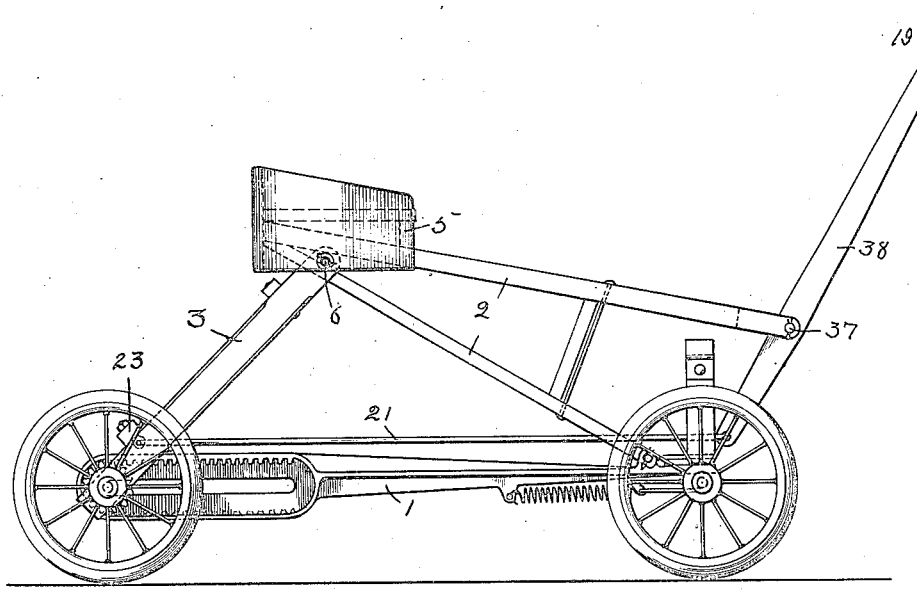
Figure 1 is a side elevation of the vehicle in its suspended position.
Figure 2:
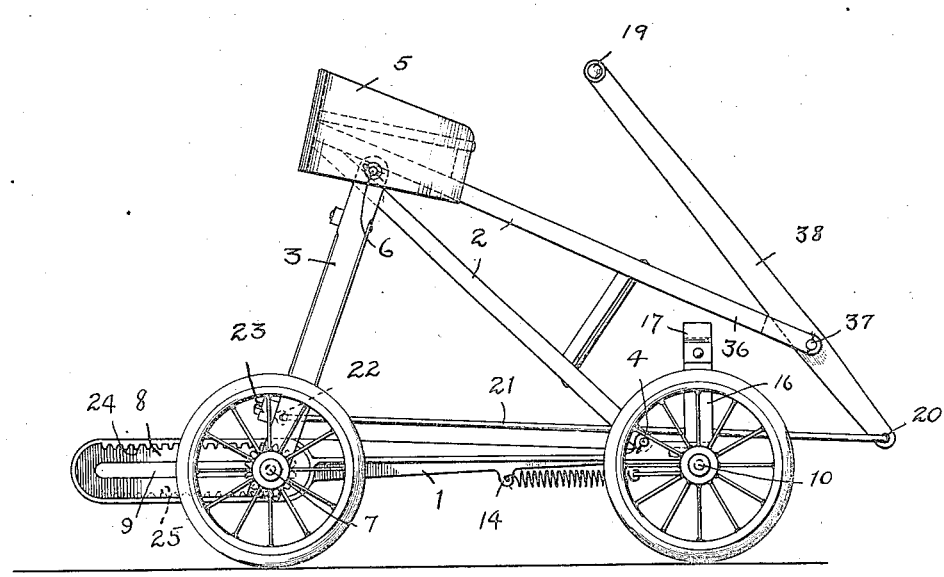
Figure 2 is a similar view of the vehicle when contracted.

The chassis of the vehicle is composed of three pivotally united structures, they being illustrated at 1, 2 and 3 respectively, the member 1 being likened to a reach for a wagon, while 2 is in the form of a reclining A-frame of fabricated construction which is superimposed upon the reach pivotally as at 4 just back of the forward axle, and at the apex of this A-frame is mounted a suitably shaped seat 5 for the operator. At the sides of the seat 5 and upon a through bolt 6 carried therein is pivotally mounted the upper end of the rear frame 3. In the lower extremity of this frame is rotatably mounted the rear axle 7 of the vehicle, the rearmost vertically extended portion 8 of the reach having an elongated slot 9 therein through which the rear axle extends.

The front axle 10 of the vehicle is pivotally mounted in the forward bifurcated end of the reach 1 as at 11 and is held normally centrally positioned thereupon by means of a crank arm 12 fixed to and carried by the axle extending rearwardly thereof and at its free end attached to the contractile helical spring 13, the opposite end of which is hooked into a suitable eye 14 in the reach 1, this attachment only being for the purpose of preventing undue motion of the axle when not being forcibly steered.

As a steering arrangement I provide in the fabricated structure of the forward bolster 15 a U-shaped member 16 having laterally spreading termini 17, they being braced apart by a suitable U-shaped bracing member 18; the termini 17 acting as a footrest for the operator of the vehicle and by which the front axle is readily turned either one way or the other, for steering the vehicle.

The upper leg of the inclined A-frame extends forwardly as at 36 beyond the front axle of the vehicle and is bifurcated for a short distance from the end thereof pivotally carrying within said bifurcated portion, as at 37, the operating lever 38 of the vehicle. The upper end of this lever has a suitable cross or transverse handle 19, and at the lower end is pivotally attached as at 20 the rod or pitman 21 extending rearwardly through the bifurcated structure of the forward bolster and connected as at 22 to the cross piece 23 of the rear axle frame 3. As before stated, this frame, being pivotally mounted in the upper end of the A-frame and through the seat 5, is susceptible of pendulum like motion on such pivotal point by the reciprocal action of the lever 38, as one sitting within the vehicle with his feet on the foot rests 17 may readily bring about during the propulsion thereof.

The widened portion 8 of the tail of the reach is of general I-beam construction as clearly seen in Figure 6 of the drawing. The under side upper right hand lateral projection is racked as at 24 and the diagonally opposite upper side of the lower left hand projecting is racked as at 25. The right and left hand expression is in respect to looking at the machine from the rear thereof.

A cogged wheel 26 is loosely mounted upon the rear axle 7 and is in constant mesh with the rack 25 while on the opposite side a similarly cogged wheel 27 is also mounted upon the axle 7 and in constant mesh with the rack 24. Each of these cogged wheels carry a pair of dogs or pawls 28 which at all times actively engage their respective ratchet wheels 29 to prevent backward rotation of same and which are each separately keyed to the axle 7 and rotate with it. By this connection it is evident that when the rear axle is rotated forwardly in respect to the chassis by the pulling of the lower part of the axle frame 3 forwardly, which occurs due to the fact that one of the rear wheels 30 is keyed to said axle as at 31 (see Fig. 6), the vehicle will be advanced forwardly until the limit of this forward stroke has been reached. At the same time the rotation of the gear wheel 26, on the rack 25, as the shaft 7 is advanced to the forward limit of the slot 9, will cause the forward wheels of the vehicle to advance less rapidly than the rear wheels in proportion to the diametrical ratio of the gear wheel 26 with the rear wheels 30 of the vehicle. Then when the operator releases his stress upon the upper end of the lever 38, his weight will tend to expand or re-open the vehicle with jackknifing effect which will cause forward thrust on the front axle 10, pulling the reach forwardly and rotating the gear 27 which in turn continues forward rotative action of the axle 7, further advancing the vehicle in its forward travel, the travel of which, in relation to its previous action, is governed by the diametrical ratio of the wheel 27 to that of the rear wheels 30.

While I have shown the traction of the vehicle as being accomplished by one only of the rear wheels 30 being fixed to the axle, it is well known to those versed in such mechanisms that ratchets might be used in each of the rear wheels which would permit of differential movement and yet accomplish the same result, so that I do not wish to be confined to the specific manner of accomplishing traction herein disclosed as the same is done for simplicity of description, and various modifications of other portions of the embodiment here shown may be resorted to without departing from the spirit of the invention.

Having thus described my invention, what I claim and desire to secure by Letters Patent, is:

1. A wheeled vehicle of the class described comprising a front axle, a rear axle, a reach uniting said axles, a superimposed two-part frame structure one part of which is pivotally mounted upon the forward end of the reach and the other part pivotally carried upon the rear axle, a seat in close juxtaposition to the pivotal union of the two parts, a lever pivoted in the forward end of the first mentioned part of the superstructure and operable from the seat, means connecting the lower end of the lever with the lower end of the second mentioned part, means whereby the rear axle may be operated independently of the action of the reach, and means cooperatively uniting the rear axle and the reach whereby independent motion of either will rotate the axle forwardly for the purpose described.

2. A vehicle of the class described comprising a wheeled forward axle, a wheeled rear axle, a reach pivotally attached to the forward axle and horizontally attached in respect to the rear axle, an inclined frame pivotally attached to the reach adjacent the forward axle and pivotally carrying an operating lever, an inclined frame in which the rear axle is journalled pivotally attached at its upper end to the upper end of the previously mentioned inclined frame, a seat adjacent the pivotal connection of the two frames, means for connecting the lower end of the inclined frame in which the rear axle is journalled with the operating lever, and means carried upon the rear axle cooperatively engaged with the reach whereby the vehicle is propelled forwardly by reciprocation of the operating lever.

3. A vehicle of the class described comprising a front wheeled axle, a rear wheeled axle, means cooperatively uniting the two axles, said union being pivotal in relation to the front axle and slidable in relation to the rear axle, means for supporting an operator upon the vehicle, means carried by the vehicle for slidably operating the rear axle in relation to the first mentioned means, and means cooperatively uniting the rear axle and said first mentioned means whereby the slidable reciprocation of the axle in either direction in relation to said first mentioned means produces forward rotation of the rear axle.

4. The combination with a supporting axle of a wheeled vehicle, of gears upon said axle, racks carried by the vehicle and meshing with the gears, means permitting backward rotation only of said gears in respect to the axle without rotating the same, and means whereby reciprocal motion of the racks in respect to the axle will impart continuous forward motion to the vehicle.

In testimony whereof I hereunto affix my signature in the presence of two witnesses.

JOHN SWINLAND.

Witnesses:
S. C. BRONSON,
S. GEO. STEVENS.